(12) United States Patent
Yamada et al.

(10) Patent No.: US 10,514,048 B2
(45) Date of Patent: Dec. 24, 2019

(54) FLUID CONTROL VALVE

(71) Applicant: SMC CORPORATION, Chiyoda-ku (JP)

(72) Inventors: Hirosuke Yamada, Tsukubamirai (JP); Kenji Shishido, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 63 days.

(21) Appl. No.: 15/771,139

(22) PCT Filed: Oct. 20, 2016

(86) PCT No.: PCT/JP2016/081039
§ 371 (c)(1),
(2) Date: Apr. 26, 2018

(87) PCT Pub. No.: WO2017/073439
PCT Pub. Date: May 4, 2017

(65) Prior Publication Data
US 2018/0355892 A1    Dec. 13, 2018

(30) Foreign Application Priority Data

Oct. 28, 2015    (JP) ................................ 2015-212084

(51) Int. Cl.
*F15B 11/024*    (2006.01)
*F15B 21/14*    (2006.01)
(Continued)

(52) U.S. Cl.
CPC .......... *F15B 11/024* (2013.01); *F15B 11/064* (2013.01); *F15B 13/042* (2013.01);
(Continued)

(58) Field of Classification Search
CPC ............................ F15B 11/064; F15B 21/14; F15B 2211/7053; F15B 2211/3058
See application file for complete search history.

(56) References Cited

U.S. PATENT DOCUMENTS 3,654,835 A * 4/1972 Sievenpiper .......... F15B 11/024
                                                                91/436
4,741,249 A * 5/1988 Legris .................... F15B 11/064
                                                                 91/443
(Continued)

FOREIGN PATENT DOCUMENTS

JP         8-42511 A      2/1996
JP       10-153269 A      6/1998

OTHER PUBLICATIONS

International Search Report dated Jan. 24, 2017 in PCT/JP2016/081039, filed on Oct. 20, 2016.

*Primary Examiner* — Thomas E Lazo
(74) *Attorney, Agent, or Firm* — Oblon, McClelland, Maier & Neustadt, L.L.P.

(57) ABSTRACT

A fluid control valve includes a supply-air passage allowing a first port and a second port to communicate with each other, an exhaust-air passage allowing the second port and a third port to communicate with each other, a first check valve provided to the supply-air passage, a second check valve provided to the exhaust-air passage, a valve element that opens and closes a passage from the second port to the third port, and a valve hole in which the valve element is housed. The exhaust-air passage is provided between the valve hole and the valve element. The valve element has a first pressure-receiving surface that causes a fluid pressure at the first port to act, and a second pressure-receiving surface that causes a fluid pressure at the second port to act.

13 Claims, 6 Drawing Sheets

(51) Int. Cl.
*F16K 31/524* (2006.01)
*F16K 11/04* (2006.01)
*F16K 15/18* (2006.01)
*F15B 15/14* (2006.01)
*F16K 31/122* (2006.01)
*F15B 11/064* (2006.01)
*F15B 13/042* (2006.01)

(52) U.S. Cl.
CPC ............ *F15B 15/149* (2013.01); *F15B 21/14* (2013.01); *F16K 11/04* (2013.01); *F16K 15/185* (2013.01); *F16K 31/122* (2013.01); *F16K 31/52416* (2013.01); *F15B 2211/3058* (2013.01); *F15B 2211/7053* (2013.01); *F15B 2211/8855* (2013.01)

(56) References Cited

U.S. PATENT DOCUMENTS

| | | | |
|---|---|---|---|
| 6,131,610 A | 10/2000 | Morisako et al. | |
| 6,227,231 B1* | 5/2001 | Hosono | F15B 11/028 137/269.5 |
| 6,293,180 B1 | 9/2001 | Morisako et al. | |
| 6,296,013 B1* | 10/2001 | Hosono | F15B 11/0413 137/454.5 |
| 6,296,015 B1 | 10/2001 | Morisako et al. | |
| 6,439,262 B1* | 8/2002 | Hosono | F15B 11/028 137/382 |
| 2014/0360349 A1 | 12/2014 | De Gier | |

* cited by examiner

FLUID CONTROL VALVE

TECHNICAL FIELD

The present invention relates to a fluid control valve, for example, a fluid control valve to be provided between a switching valve connected to a fluid-pressure source and a double-acting cylinder including first and second pressure chambers.

BACKGROUND ART

In general, a double-acting fluid-pressure cylinder is long known in which two pressure chambers separated from each other by a piston have respective air-supplying/exhausting ports, and the air-supplying/exhausting ports are alternately connected to a fluid-pressure source by, for example, switching an electromagnetic valve connected to the fluid-pressure source, whereby the piston is moved back and forth with a fluid pressure applied thereto.

Typically, in such a double-acting fluid-pressure cylinder, when the piston is moved back and forth with the fluid pressure applied thereto, compressed fluid in one of the pressure chambers that is on the exhaust side is discharged to the atmosphere as the pressure chamber contracts with the movement of the piston.

From the viewpoint of energy saving, though, the compressed air that is discharged from the pressure chamber with the movement of such a fluid-pressure actuator is desirably reused as much as possible.

Accordingly, a pneumatic cylinder apparatus is proposed by PTL 1 in which exhaust air from a rod-side pressure chamber is caused to reflux into a head-side pressure chamber and is reused when a rod of a double-acting cylinder is moved forward. This apparatus employs, as a switching valve connected to a pneumatic-pressure source, a four-way two-position switching valve having a function of supplying and exhausting compressed air into and from the cylinder and a function of causing the exhaust air to reflux.

CITATION LIST

Patent Literature

PTL 1: Japanese Unexamined Patent Application Publication No. 8-42511

SUMMARY OF INVENTION

Technical Problem

An object of the present invention is to provide a fluid control valve having a configuration suitable for the reuse of exhaust air that is extracted from a pressure chamber of a fluid-pressure actuator by connecting the fluid control valve to the pressure chamber.

Solution to Problem

To solve the above problem, a fluid control valve according to the present invention is to be provided between a switching valve connected to a fluid-pressure source and a double-acting fluid-pressure cylinder including a first pressure chamber provided on a head side and a second pressure chamber provided on a rod side, in which when the fluid-pressure cylinder is activated with a switching of the switching valve, compressed fluid that is discharged from the second pressure chamber of the fluid-pressure cylinder is caused to reflux into the first pressure chamber. The fluid control valve includes a first port to be connected to the switching valve, a second port to be connected to the second pressure chamber, a third port to be connected to the first pressure chamber, a supply-air passage allowing the first port and the second port to communicate with each other, an exhaust-air passage allowing the second port and the third port to communicate with each other, a first check valve provided to the supply-air passage and allowing the compressed fluid to flow from a side of the first port toward a side of the second port while preventing the compressed fluid from flowing from the side of the second port toward the side of the first port, a second check valve provided to the exhaust-air passage and allowing the compressed fluid to flow from the side of the second port toward a side of the third port while preventing the compressed fluid from flowing from the side of the third port toward the side of the second port, a valve element that opens and closes a passage from the second port to the third port, and a valve hole through which the valve element extends in such a manner as to be slidable in an axial direction of the valve element. The exhaust-air passage is a gap provided between the valve hole and the valve element. The valve element has a first pressure-receiving surface that causes a fluid pressure at the first port to act in a closing direction of the valve element, and a second pressure-receiving surface that causes a fluid pressure at the second port to act in an opening direction of the valve element.

Another fluid control valve according to the present invention includes a first port, a second port, and a third port through which compressed fluid flows; a supply-air passage allowing the first port and the second port to communicate with each other; an exhaust-air passage allowing the second port and the third port to communicate with each other; a first check valve provided to the supply-air passage and allowing the compressed fluid to flow from a side of the first port toward a side of the second port while preventing the compressed fluid from flowing from the side of the second port toward the side of the first port; a second check valve provided to the exhaust-air passage and allowing the compressed fluid to flow from the side of the second port toward a side of the third port while preventing the compressed fluid from flowing from the side of the third port toward the side of the second port; a valve element that opens and closes a passage from the second port to the third port; and an opening-and-closing-operation portion causing the valve element to open and close. The opening-and-closing-operation portion has a first pressure-receiving surface provided to the valve element and that causes a fluid pressure at the first port to act in a closing direction of the valve element, and a second pressure-receiving surface also provided to the valve element and that causes a fluid pressure at the second port to act in an opening direction of the valve element.

In this case, it is preferable that the fluid control valve have a valve hole through which the valve element extends in such a manner as to be slidable in an axial direction of the valve element, and that the exhaust-air passage be a gap provided between the valve hole and the valve element.

Furthermore, in this case, it is preferable that the valve element have a rod-like shape with a substantially circular cross-section; have, at two ends in the axial direction, a first end on a proximal side and a second end on a distal side, respectively; and include a shaft portion positioned on a side of the first end and a valve portion continuous with a side of the second end of the shaft portion, the valve portion having the second pressure-receiving surface.

In this case, it is more preferable that the shaft portion of the valve element include a piston, and that the first pressure-receiving surface positioned on the side of the first end of the piston define a piston pressure chamber to which a pilot passage that allows the compressed fluid from the first port to be supplied to the piston pressure chamber is connected.

Furthermore, it is preferable that the valve portion include a large-diameter part continuous with the shaft portion, and a small-diameter part continuous with the side of the second end of the large-diameter part and having a maximum diameter smaller than that of the large-diameter part, with a sealing member interposed between the large-diameter part and the small-diameter part; that the valve hole have a throttle part provided between the second port and the exhaust-air passage and through which the small-diameter part of the valve portion extends; and that the throttle part have a valve seat, the sealing member coming into contact with and moving away from the valve seat.

In this case, it is preferable that the fluid control valve include a flow-rate-adjusting portion for adjusting a flow rate of exhaust air that flows from the second port into the exhaust-air passage at the opening of the valve portion; that the flow-rate-adjusting portion include an inclined cam surface extending helically around the shaft portion of the valve element, and a stopper tab also provided around the shaft portion of the valve element, the stopper tab coming into contact with the inclined cam surface while preventing the valve element from moving in the first-end side at the opening of the valve portion; that the inclined cam surface and the stopper tab be rotatable relative to each other and about an axis of the valve element; and that the small-diameter part of the valve portion have a tapered shape whose diameter is gradually reduced toward the second end.

Furthermore, it is more preferable that the shaft portion of the valve element include a piston, and the first pressure-receiving surface positioned on the side of the first end of the piston define a piston pressure chamber to which a pilot passage that allows the compressed fluid from the first port to be supplied to the piston pressure chamber is connected; that the inclined cam surface face the piston from the first-end side of the piston; and that the valve element extend through the valve hole in such a manner as to be rotatable in a peripheral direction, and the stopper tab project from an outer periphery of the shaft portion toward an inner side of the piston pressure chamber.

Advantageous Effects of Invention

According to the present invention, when the second port is connected to the pressure chamber of the fluid-pressure actuator, the compressed fluid can be supplied from the first port to the pressure chamber through the second port. Furthermore, the exhaust air from the pressure chamber can be extracted from the third port through the second port and can be reused. For example, if the second port is connected to a rod-side pressure chamber of a double-acting fluid cylinder while the third port is connected to a head-side pressure chamber, the exhaust air from the rod-side pressure chamber can be caused to reflux into the head-side pressure chamber when the rod is moved forward, whereby the consumption of the compressed fluid can be suppressed.

DESCRIPTION OF EMBODIMENTS

An embodiment of the fluid control valve according to the present invention will now be described in detail with reference to the drawings. The fluid control valve according to the present invention is to be connected to a pressure chamber of a fluid-pressure actuator and is thus used for extracting and reusing exhaust air from the pressure chamber. Herein, an exemplary case illustrated in FIG. 5 will be described in which a fluid control valve 10 according to an embodiment of the present invention is connected to a double-acting fluid-pressure cylinder 1 including a piston 1c and a rod 1d, and when the piston 1c is moved forward, exhaust air that is discharged from a second pressure chamber 1b provided on a rod side of the fluid-pressure cylinder 1 is caused to reflux into a first pressure chamber 1a provided on a head side, whereby the exhaust air is reused.

As illustrated in FIGS. 1 to 5, the fluid control valve 10 includes a first port 11 for the connection to a switching valve 3, a second port 12 for the connection to the second pressure chamber 1b, a third port 13 for the connection to the first pressure chamber 1a, a supply-air passage 14 that allows the first port 11 and the second port 12 to communicate with each other, and an exhaust-air passage 15 that allows the second port 12 and the third port 13 to communicate with each other.

The first to third ports 11 to 13, the supply-air passage 14, and the exhaust-air passage 15 are provided in a valve housing 50. The valve housing 50 includes a main block 51. The main block 51 includes a tubular trunk portion 51a having an axis L (an axis extending vertically in FIGS. 1 and 3, and whose upper side is defined as the first-end side and whose lower side is defined as the second-end side), and tubular first and second branch portions 51b and 51c extending from the sidewall of the trunk portion 51a. The valve housing 50 further includes a first-port block 52 airtightly fitted on the first branch portion 51b and including the first port 11, and a second-port block 53 airtightly fitted on the second-end side of the trunk portion 51a and including the second port 12. The third port 13 is provided in the second branch portion 51c. Furthermore, an end cap 54 is provided on the first-end side of the trunk portion 51a in such a manner as to be rotatable about the axis L.

The supply-air passage 14 includes a first supply-air passage 14a passing through the first-port block 52, a second supply-air passage 14b passing through the first branch portion 51b, and a third supply-air passage 14c provided on the second-end side of the trunk portion 51a. The third supply-air passage 14c is provided with a first check valve 20 that allows compressed fluid supplied from a fluid-pressure source 2 to flow from the side of the first port 11 toward the side of the second port 12 but prevents the compressed fluid from flowing from the side of the second port 12 toward the side of the first port 11.

The exhaust-air passage 15 includes a first exhaust-air passage 15a passing through the second branch portion 51c, and a second exhaust-air passage 15b provided on the second-end side of a rod insertion hole 22, which will be described below. The second exhaust-air passage 15b is provided with a second check valve 21 that allows the flow from the side of the second port 12 toward the side of the third port 13 but prevents the flow from the side of the third port 13 toward the side of the second port 12.

The trunk portion 51a is provided thereinside with the rod insertion hole 22 serving as a valve hole defined by an inner peripheral wall 51d of the trunk portion 51a. The rod insertion hole 22 passes through the trunk portion 51a in the long-side direction (the direction of the axial line L). The trunk portion 51a is further provided thereinside with a valve element 30 that is slidable in the direction of the axial line L in the rod insertion hole 22. The valve element 30 is provided for opening and closing a passage from the second port 12 to the exhaust-air passage 15b, i.e., a passage from the second port 12 to the third port 13. The valve element 30 has a rod-like shape with a substantially circular cross-section and is rotatable about the axial line L in the rod insertion hole 22. The valve element 30 includes a shaft portion 32 positioned on the first-end side, i.e., the proximal side; and a valve portion 31 positioned on the second-end side, i.e., the distal side, in the direction of the axial line L thereof. The shaft portion 32 has a first pressure-receiving surface that causes the fluid pressure at the first port 11 to act in a closing direction of the valve element 30 (a second-end direction). The valve portion 31 has a second pressure-receiving surface that causes the fluid pressure at the second port 12 to act in an opening direction of the valve element 30 (a first-end direction). Regardless of the opening and closing behavior of the valve element 30, the pressure-receiving area of the first pressure-receiving surface in the direction of the axial line L is always greater than the pressure-receiving area of the second pressure-receiving surface in the direction of the axial line L.

The rod insertion hole 22 includes a shaft insertion portion 22a positioned on the first-end side and through which the shaft portion 32 extends, and a valve insertion portion 22b positioned on the second-end side and through which the valve portion 31 extends. The shaft insertion portion 22a and the valve insertion portion 22b are airtightly separated from each other by a sealing member 60 provided on a partition wall 23 that separates the two from each other. The valve insertion portion 22b has a bore diameter larger than the maximum diameter of the valve portion 31 (the diameter of a large-diameter part 33 to be described below). A gap provided between the inner peripheral wall 51d of the valve insertion portion 22b and the outer peripheral surface of the valve portion 31 (i.e., the outer peripheral surface of the large-diameter part 33) serves as the second exhaust-air passage 15b.

The trunk portion 51a has a groove 57 in the outer peripheral surface thereof on the second-end side. The first check valve 20 is fitted in the groove 57. The valve insertion portion 22b of the rod insertion hole 22 has an annular projection 48 at a position on the second-end side (i.e., on the side nearer to the second port 12) with respect to the second check valve 21. The projection 48 projects inward (in the radial direction) from the inner peripheral wall 51d. A surface of the projection 48 that faces toward the first-end side forms a valve seat 44. The valve portion 31 comes into contact with and moves away from the valve seat 44. The inner periphery of the projection 48 forms a throttle part 46 into which a small-diameter part 34, which will be described below, of the valve portion 31 is insertable.

The valve portion 31 includes the large-diameter part 33, which is continuous with the shaft portion 32 and has a round-columnar shape, and the small-diameter part 34, which is continuous with the second-end side of the large-diameter part 33 and whose maximum diameter is smaller than that of the large-diameter part 33. The large-diameter part 33 has a groove 58 in the outer peripheral surface thereof. The second check valve 21 described above is fitted in the groove 58. The small-diameter part 34 has a tapered shape whose diameter is gradually reduced toward the second end, and has a distal end face 36a at the tip thereof. The direction of the axial line L of the valve element 30 corresponds to the direction of the normal to the distal end face 36a. The connection, i.e., the boundary, between the large-diameter part 33 and the small-diameter part 34 has a groove 36b forming a step. A sealing member 35 is fitted in the groove 36b.

The sealing member 35 is provided on the valve portion 31 in such a manner as to come into contact with the valve seat 44 when the valve element 30 is moved toward the second-end side and to be spaced apart from the valve seat 44 when the valve element 30 is moved toward the first-end side. Therefore, comparing a state where the sealing member 35 and the valve seat 44 are in contact with each other and a state where the sealing member 35 and the valve seat 44 are spaced apart from each other, that is, comparing the valve portion 31 that is in a closing state and the valve portion 31 that is in an opening state, the valve portion 31 that is in the opening state has a larger area (pressure-receiving area) in the second pressure-receiving surface thereof upon which the fluid pressure acts in the first-end direction. Consequently, the urging force acting on the valve element 30 in the first-end direction is increased, and the responsiveness after the opening behavior of the valve portion 31 is improved.

The shaft portion 32 includes a body part 38 continuous with the first-end side of the large-diameter part 33 and having a larger diameter than the large-diameter part 33, and a stick part 39 continuous with the first-end side of the body part 38 and projecting from an opening provided on the first-end side of the trunk portion 51a. The body part 38 includes a piston 37, on the outer periphery of which a sealing member 62 is provided. The piston 37 separates the shaft insertion portion 22a of the rod insertion hole 22 described above into a first-section chamber 70a provided on the first-end side and a second-section chamber 70b provided on the second-end side. In the present embodiment, the sealing member 62 provided on the piston 37 serves as a check valve that allows a fluid to flow from the side of the second-section chamber 70b toward the side of the first-section chamber 70a but prevents the fluid from flowing from the side of the first-section chamber 70a toward the side of the second-section chamber 70b. Hence, the first-section chamber 70a serves as a piston pressure chamber for moving the piston 37 in the second-end direction, whereas the second-section chamber 70b is open to the atmosphere.

The stick part 39 is fitted in a fitting hole 59 provided in the end cap 54. The end cap 54 is fixed with respect to the stick part 39 in the direction around the axial line L. That is, when the end cap 54 is rotated about the axial line L, the stick part 39 is also rotated.

Figure 4:
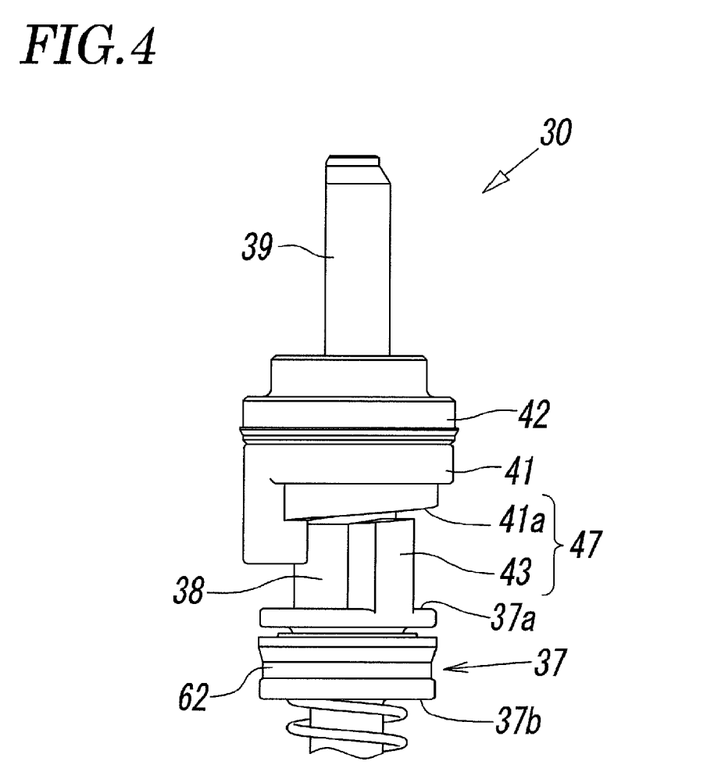
FIG. 4 is a front view of a flow-rate-adjusting portion and associated elements provided therearound.

An annular stator 41 (a cam ring having a cam surface 41a that is inclined helically) is fitted in the shaft insertion portion 22a and is fixed at a position on the first-end side with respect to the piston 37. The shaft portion 32 of the valve element 30 extends through the stator 41 in such a manner as to be slidable in the direction of the axial line L and rotatable about the axial line L. As illustrated in FIG. 4, a surface of the stator 41 that is on the second-end side forms the inclined cam surface 41a extending around the shaft portion 32. The inclined cam surface 41a faces the piston 37 and extends helically around the axial line L. The body part 38 of the shaft portion 32 has a stopper tab 43 projecting from the outer peripheral wall thereof and extending from a first-end-side surface 37a of the piston 37 toward the stator 41.

When the end cap 54 is rotated, the body part 38 is rotated together with the end cap 54 with the stator 41 fixed to the trunk portion 51a. Therefore, the stopper tab 43 projecting from the body part 38 rotates relative to the stator 41 and about the axial line L. Note that the inclined cam surface 41a of the stator 41 extends helically and forms an inclined surface. Therefore, by adjusting the position to which the end cap 54 is rotated, the position where the stopper tab 43 comes into contact with the inclined cam surface 41a, i.e., the length of stroke of the piston 37 in the first-end direction, can be adjusted. Consequently, the amount of reduction at the throttle part 46 when the valve element 30 is moved to the opening position on the first-end side, that is, the flow rate of the fluid flowing from the second port 12 and passing through the throttle part 46 into the exhaust-air passage 15, can be adjusted. Thus, the inclined cam surface 41a and the stopper tab 43 form a flow-rate-adjusting portion 47 according to the present invention.

Note that an annular cap member 42 is airtightly fitted in the shaft insertion portion 22a while adjoining the first-end side of the stator 41, and the shaft portion 32 of the valve element 30 extends airtightly through the cap member 42 in such a manner as to be slidable in the direction of the axial line L and rotatable about the axial line L.

The first-section chamber 70a and the second supply-air passage 14b are connected to each other with a pilot passage 71 that allows the compressed fluid from the first port 11 to be supplied. Therefore, when the compressed fluid supplied to the first port 11 flows through the supply-air passage 14 into the second port 12, some of the compressed fluid is supplied to the first-section chamber 70a through the pilot passage 71. Then, the fluid pressure of the compressed fluid supplied to the first-section chamber 70a acts on the first pressure-receiving surface positioned on the first-end side with respect to the piston 37. Consequently, the piston 37 is moved in the second-end direction, i.e., in the direction in which the valve element 30 is closed.

The second-section chamber 70b is provided with a compression spring 25 that applies an urging force acting in the first-end direction (i.e., the opening direction of the valve element 30) to the piston 37. The compression spring 25 is provided in a compressed state between a spring-receiving part 24, which is attached to the connection between the shaft insertion portion 22a and the valve insertion portion 22b (i.e., the partition wall 23), and a second-end-side surface 37b of the piston 37.

Thus, the first pressure-receiving surface of the shaft portion 32, the second pressure-receiving surface of the valve portion 31, and the compression spring 25 form an opening-and-closing-operation portion according to the present invention.

The modulus of elasticity of the compression spring 25 should be determined appropriately on the basis of factors such as the pressure of the compressed fluid applied, the required characteristics of the fluid-pressure actuator to be connected, and so forth. Note that when the valve portion 31 is seated and is in the closing state, the sum of the urging forces in the first-end direction that are generated by the compression spring 25 and by the fluid pressure acting on the second pressure-receiving surface is set to be smaller than the urging force in the second-end direction that is generated by the fluid pressure acting on the first pressure-receiving surface.

The compression spring 25 is not necessarily provided and may be omitted. In that case, the valve element 30 may be moved in the opening direction by using only the fluid pressure at the second port 12 that acts on the second pressure-receiving surface.

Now, specific behaviors of the fluid control valve 10 in a case illustrated in FIG. 5 will be described in which the fluid control valve 10 is connected to the double-acting fluid-pressure cylinder 1 including the piston 1c and the rod 1d, whereby when the piston 1c is moved forward, exhaust air discharged from the second pressure chamber 1b provided on the rod side of the fluid-pressure cylinder 1 is caused to reflux into the first pressure chamber 1a provided on the head side.

In this case, the fluid control valve 10 is connected between the switching valve 3, which is connected to the fluid-pressure source 2, and the fluid-pressure cylinder 1, which includes the first pressure chamber 1a on the head side and the second pressure chamber 1b on the rod side. The switching valve 3 and the fluid-pressure cylinder 1 are connected to each other with a first passage 4a connecting the switching valve 3 and the first port 11 of the fluid control valve 10 to each other, a second passage 4b connecting the second pressure chamber 1b and the second port 12 of the fluid control valve 10 to each other, a third passage 4c connecting the first pressure chamber 1a and the switching valve 3 to each other, and a fourth passage 4d connecting the third passage 4c and the third port of the fluid control valve 10 to each other. The third passage 4c is provided with a throttle valve 5 at a position between the connection thereof to the fourth passage 4d and the first pressure chamber 1a. The throttle valve 5 is of a meter-out-control type for adjusting the flow rate of the compressed fluid that is discharged from the first pressure chamber 1a.

The position of the switching valve 3 is selectively switchable between a first position where the compressed fluid from the fluid-pressure source 2 is supplied to the second pressure chamber 1b and a second position where the compressed fluid from the fluid-pressure source 2 is supplied to the first pressure chamber 1a.

Hence, a case where the switching valve 3 is switched to the first position, that is, a case where the rod 1d of the fluid-pressure cylinder 1 is moved backward, will be described first.

The compressed fluid supplied from the fluid-pressure source 2 is supplied to the first port 11 of the fluid control valve 10 described above through the first passage 4a. The compressed fluid supplied to the first port 11 flows through the first supply-air passage 14a and the second supply-air passage 14b in that order, and some of the compressed fluid is supplied to the pilot passage 71 described above while the remainder is supplied to the third supply-air passage 14c. The compressed fluid supplied to the third supply-air passage 14c flows through the first check valve 20, is outputted from the second port 12, and is supplied to the second pressure chamber 1*b* of the fluid-pressure cylinder 1. Meanwhile, the compressed air in the first pressure chamber 1*b* of the fluid-pressure cylinder 1 is released into the atmosphere through the throttle valve 5 and the switching valve 3.

Figure 3:
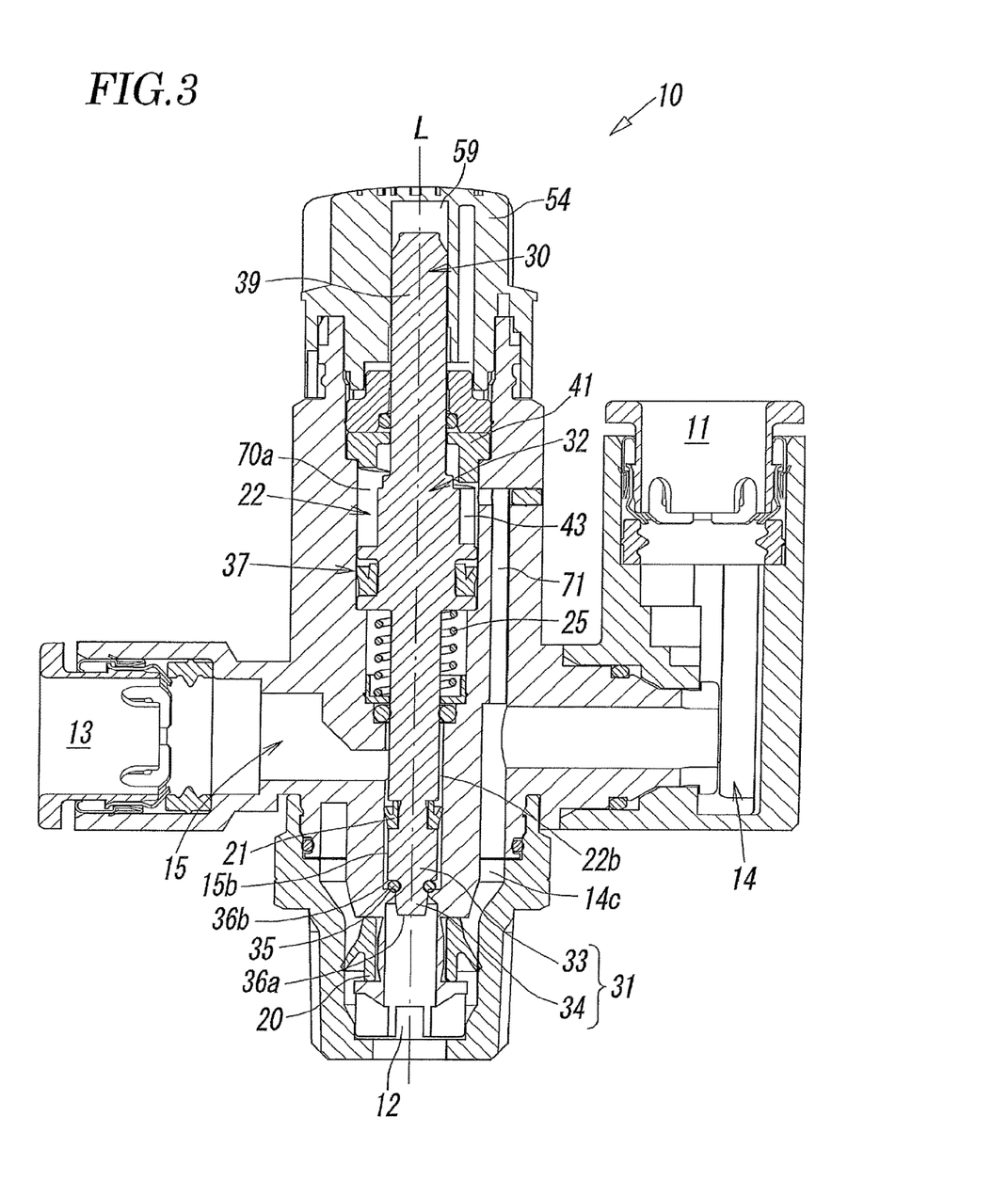
FIG. 3 is a sectional view of the fluid control valve according to the present invention with the valve element thereof being in a closing state.

The compressed fluid flowed into the pilot passage 71 is supplied to the first-section chamber 70*a* serving as the piston pressure chamber described above. In this step, the pressure of the compressed fluid that is being supplied to the first-section chamber 70*a* and the fluid pressure of the compressed fluid that is being outputted from the second port 12 are substantially the same. However, since there is a difference in the pressure-receiving area, the urging force generated in the first-end direction (in the opening direction of the valve element 30) by the fluid pressure acting on the second pressure-receiving surface of the valve portion 31 is smaller than the urging force generated in the second-end direction (in the closing direction of the valve element 30) by the fluid pressure acting on the first pressure-receiving surface of the shaft portion 32. Moreover, the difference between the urging forces generated by the respective fluid pressures is always set to a value greater than the urging force generated in the first-end direction by the compression spring 25 with the valve portion 31 being seated and in the closing state. Hence, as illustrated in FIG. 3, while the valve element 30 is seated on the valve seat 44, the passage between the second port 12 and the exhaust-air passage 15, i.e., the passage from the second port 12 to the third port 13, is closed.

Figure 5:
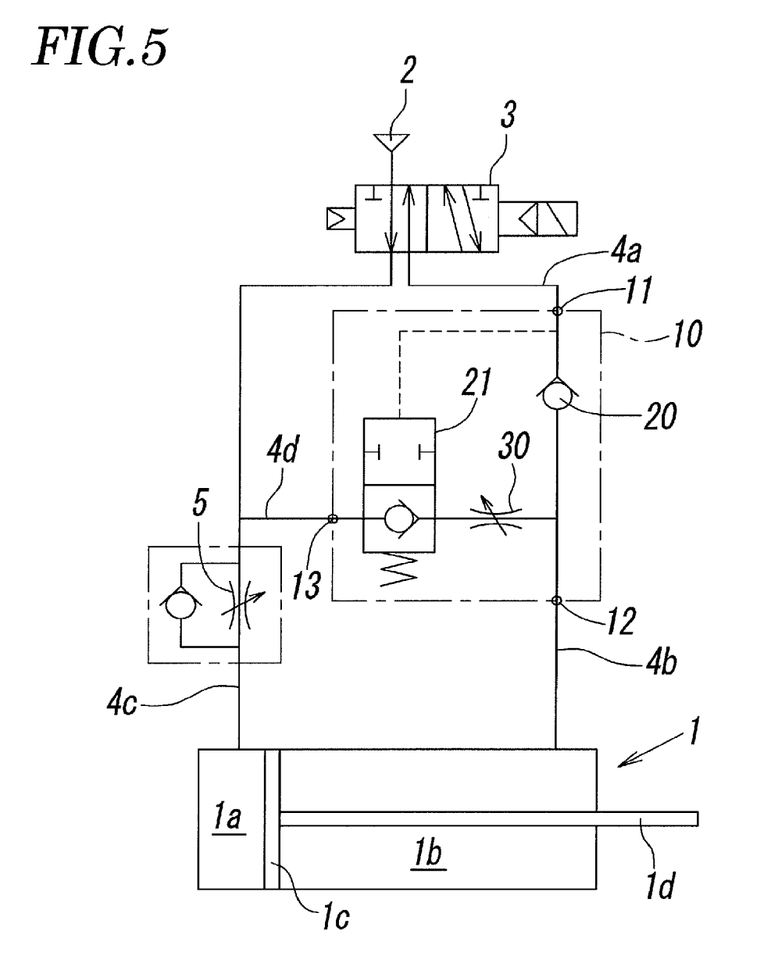
FIG. 5 is a circuit diagram illustrating an exemplary control circuit in which a double-acting fluid-pressure cylinder is controlled by using the fluid control valve according to the present invention.

Now, a case where the switching valve 3 is switched to the second position as illustrated in FIG. 5, that is, a case where the rod 1*d* of the fluid-pressure cylinder 1 is moved forward, will be described.

Figure 1:
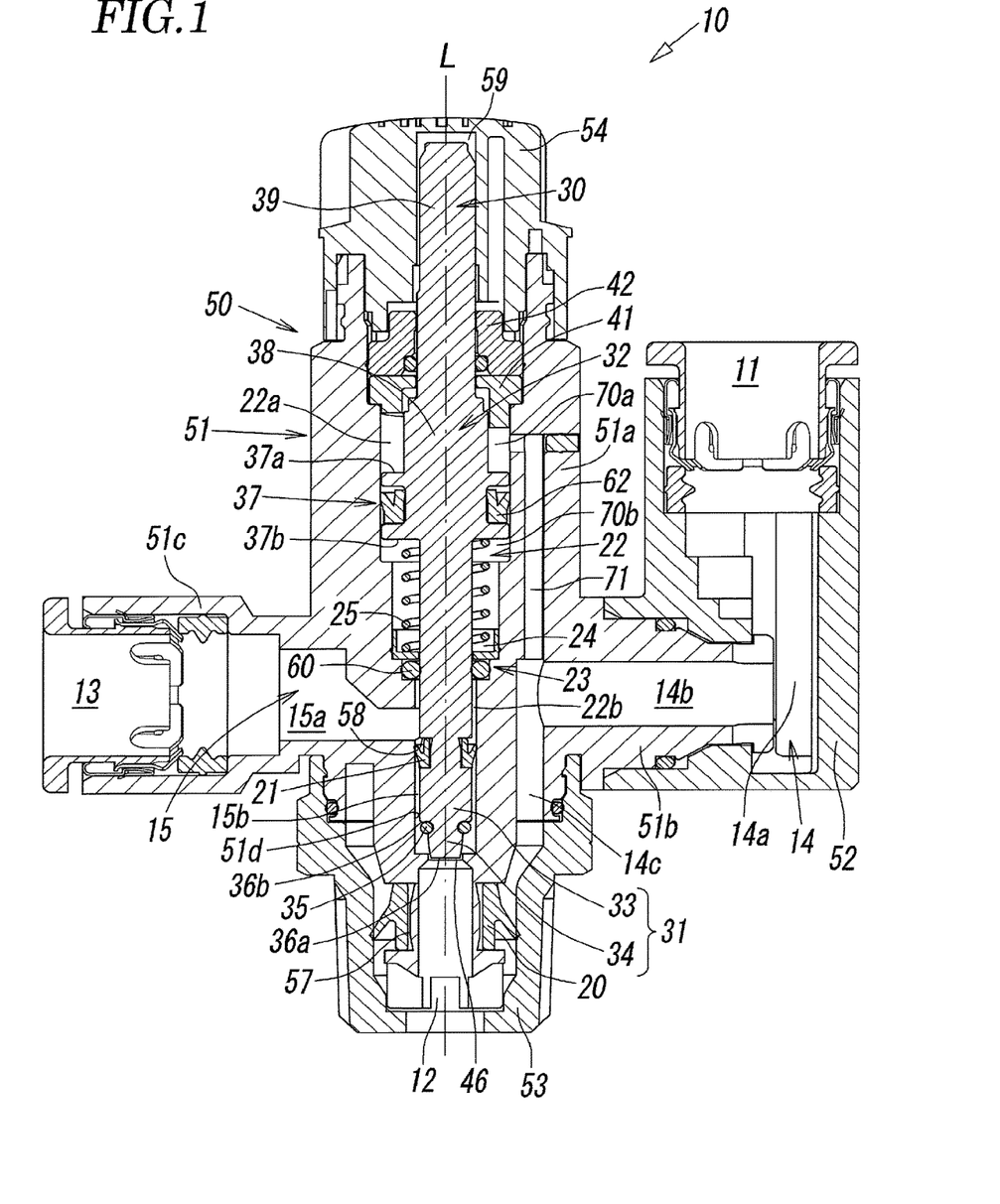
FIG. 1 is a sectional view of a fluid control valve according to the present invention with a valve element thereof being in an opening state.
Figure 2:
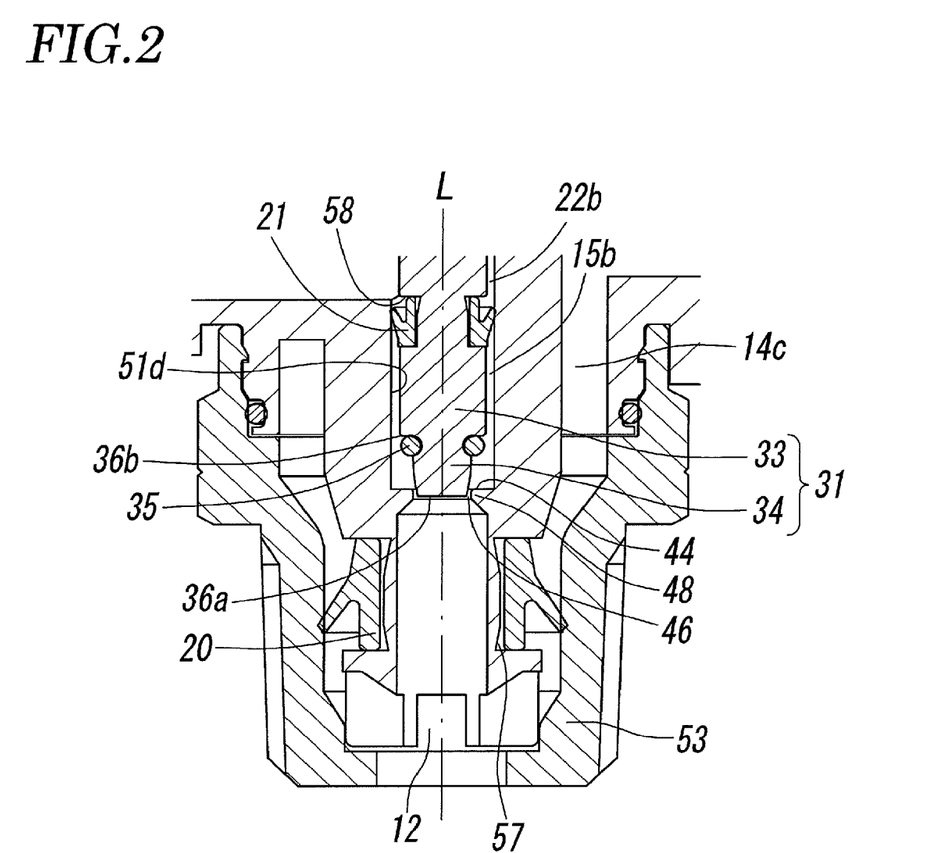
FIG. 2 is an enlargement of a part including a valve portion illustrated in FIG. 1.

In this case, the first passage 4*a* is open to the atmosphere through the switching valve 3. Therefore, in the fluid control valve 10, a portion of the supply-air passage 14 that extends from the first port 11 up to the first check valve 20, the pilot passage 71, and the first-section chamber 70*a* are also open to the atmosphere. In contrast, the compressed fluid in a portion from the first check valve 20 up to the second pressure chamber 1*b* of the fluid-pressure cylinder 1 is prevented from flowing toward the side of the first port 11 by the first check valve 20. Therefore, the fluid pressure of the compressed fluid acts on the second pressure-receiving surface of the valve portion 31 and urges the valve element 30 in the opening direction. Simultaneously, the compression spring 25 is urging the valve element 30 in the opening direction. Therefore, as illustrated in FIG. 1, the valve element 30 is spaced apart from the valve seat 44, and the passage between the second port 12 and the exhaust-air passage 15, i.e., the passage from the second port 12 to the third port 13, is opened.

Figure 6:
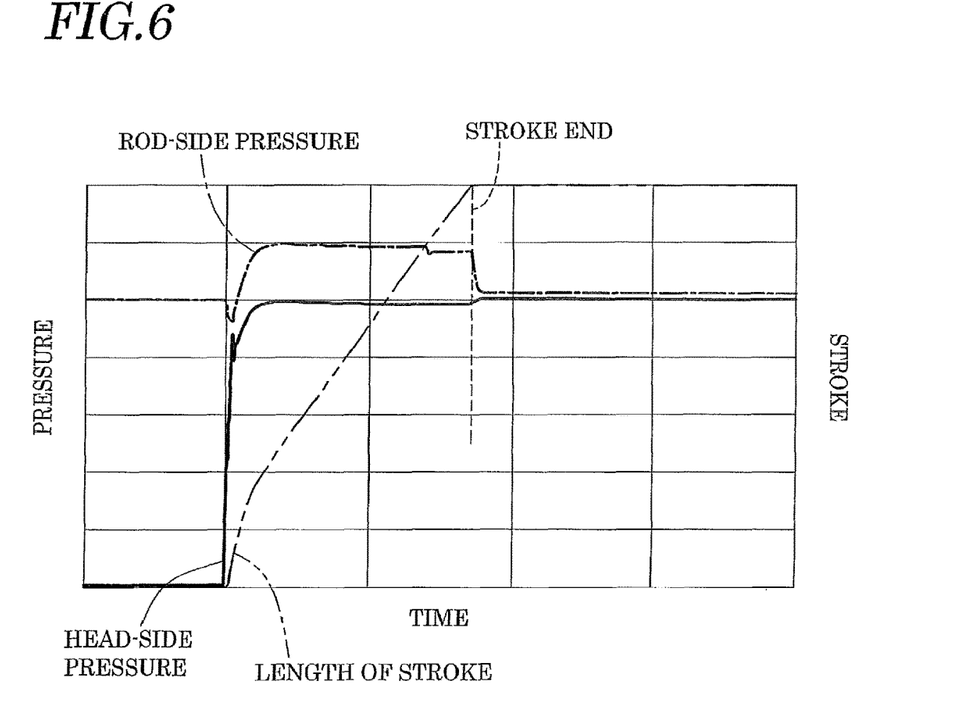
FIG. 6 is a graph illustrating the relationship between the fluid pressure in each of a head-side pressure chamber and a rod-side pressure chamber and the length of stroke of a piston when compressed fluid is caused to reflux from the head-side pressure chamber into the rod-side pressure chamber.

Meanwhile, the first pressure chamber 1*a* communicates with the fluid-pressure source 2. Therefore, the compressed fluid is supplied to the first pressure chamber 1*a* provided on the head side. Accordingly, as illustrated in FIG. 6, the pressure in the first pressure chamber 1*a* provided on the head side rapidly increases to a predetermined value, and the piston 1*c* of the fluid-pressure cylinder 1 starts to move toward the rod side (the right side in FIG. 5).

Then, with the movement of the piston 1*c* toward the rod side, the volume of the second pressure chamber 1*b* is reduced, and the pressure in the second pressure chamber 1*b* increases slightly. However, since the pressure-receiving area of the piston 1*c* on the side of the first pressure chamber 1*a* is larger than the pressure-receiving area of the piston 1*c* on the side of the second pressure chamber 1*b* by the cross-sectional area of the rod 1*d*, the piston 1*c* keeps moving toward the rod side. During this process, the compressed fluid discharged from the second pressure chamber 1*b* flows from the exhaust-air passage 15, passes through the third port 13, and flows into the fourth passage 4*d*. However, since the pressure of the compressed fluid discharged from the second pressure chamber 1*b* is slightly higher than the pressure in the first pressure chamber 1*a* as described above, the compressed fluid in the fourth passage 4*d* is caused to reflux into the first pressure chamber 1*a* through the third passage 4*c*. To adjust the speed at which the rod 1*d* is moved forward, the amount of reduction at the throttle part 46, i.e., the flow rate of the exhaust air from the second pressure chamber 1*b* that flows through the throttle part 46, only needs to be adjusted by rotating the end cap 54.

As described above, the fluid control valve 10 according to the present embodiment is configured such that the compressed fluid can be supplied from the first port 11 to the second pressure chamber 1*b* through the second port 12 by connecting the second port 12 to the second pressure chamber 1*b* of the fluid-pressure cylinder 1 serving as the fluid-pressure actuator, and such that the exhaust air discharged from the second pressure chamber 1*b* can be extracted from the third port 13 through the second port 12. Therefore, the exhaust air can be reused efficiently. In particular, in the double-acting fluid-pressure cylinder 1 described above, by connecting the second port 12 to the second pressure chamber 1*b* while connecting the third port 13 to the first pressure chamber 1*a*, the exhaust air from the second pressure chamber 1*b* can be caused to reflux into the first pressure chamber 1*a* when the rod 1*d* is moved forward, whereby the consumption of the compressed fluid can be suppressed.

Furthermore, since the valve element 30 is openable and closeable by using the compressed air for activating the fluid-pressure cylinder 1, the manufacturing cost and the running cost can be suppressed.

In the fluid control valve 10 according to the present embodiment, the rod-shaped valve portion 31 includes the large-diameter part 33 and the small-diameter part 34, and the sealing member 35 that comes into contact with and moves away from the valve seat 44 is provided at the boundary between the two. Therefore, comparing the state where the sealing member 35 and the valve seat 44 are in contact with each other and the state where the sealing member 35 and the valve seat 44 are spaced apart from each other, that is, comparing the valve portion 31 that is in the closing state and the valve portion 31 that is in the opening state, the valve portion 31 that is in the latter state has a larger area (pressure-receiving area) in the second pressure-receiving surface thereof upon which the fluid pressure acts in the first-end direction. Consequently, the urging force acting on the valve element 30 in the first-end direction is increased, and the responsiveness after the opening behavior of the valve portion 31 is improved.

Furthermore, in the fluid control valve 10 according to the present embodiment, the valve portion 31 is a needle valve, and the inclined cam surface 41*a* of the stator 41 that extends helically and the stopper tab 43 that is in contact therewith are rotatable relative to each other about the axial line L. Therefore, by rotating the valve element 30 and thus adjusting the position where the inclined cam surface 41*a* and the stopper tab 43 come into contact with each other, the flow rate of the exhaust air at the throttle part 46 when the valve element 30 is in the opening state can be controlled easily.

While an embodiment of the fluid control valve 10 according to the present invention has been described in detail above, the present invention is not limited to the above embodiment, and various design changes can be made thereto without departing from the essence of the present invention. For example, while the valve portion 31 according to the above embodiment is a needle valve, the valve portion 31 is not necessarily limited thereto and may be a valve of any other type such as a poppet valve.

Moreover, while the present embodiment concerns a case where the inclined cam surface 41a is fixed with respect to the rod insertion hole 22 and the stopper tab 43 to be brought into contact therewith is fixed to the valve element 30, the inclined cam surface 41a may alternatively be fixed with respect to the valve element 30 and the stopper tab 43 may be fixed to the rod insertion hole.

REFERENCE SIGNS LIST 1 fluid-pressure cylinder
1a first pressure chamber
1b second pressure chamber
2 fluid-pressure source
3 switching valve
10 fluid control valve
11 first port
12 second port
13 third port
14 supply-air passage
15 exhaust-air passage
15b second exhaust-air passage (gap)
20 first check valve
21 second check valve
22 rod insertion hole (valve hole)
30 valve element
31 valve portion
32 shaft portion
33 large-diameter part
34 small-diameter part
35 sealing member
37 piston
41 stator
41a inclined cam surface
43 stopper tab
44 valve seat
46 throttle part
47 flow-rate-adjusting portion
70a first-section chamber (piston pressure chamber)
71 pilot passage

The invention claimed is:

1. A fluid control valve to be provided between a switching valve connected to a fluid-pressure source and a double-acting fluid-pressure cylinder including a first pressure chamber provided on a head side and a second pressure chamber provided on a rod side, in which when the fluid-pressure cylinder is activated with a switching of the switching valve, compressed fluid that is discharged from the second pressure chamber of the fluid-pressure cylinder is caused to reflux into the first pressure chamber, the fluid control valve comprising:
a first port to be connected to the switching valve;
a second port to be connected to the second pressure chamber;
a third port to be connected to the first pressure chamber;
a supply-air passage allowing the first port and the second port to communicate with each other;
an exhaust-air passage allowing the second port and the third port to communicate with each other;
a first check valve provided to the supply-air passage and allowing the compressed fluid to flow from a side of the first port toward a side of the second port while preventing the compressed fluid from flowing from the side of the second port toward the side of the first port;
a second check valve provided to the exhaust-air passage and allowing the compressed fluid to flow from the side of the second port toward a side of the third port while preventing the compressed fluid from flowing from the side of the third port toward the side of the second port;
a valve element that opens and closes a passage from the second port to the third port; and
a valve hole through which the valve element extends in such a manner as to be slidable in an axial direction of the valve element,
wherein the exhaust-air passage is a gap provided between the valve hole and the valve element, and
wherein the valve element has a first pressure-receiving surface that causes a fluid pressure at the first port to act in a closing direction of the valve element, and a second pressure-receiving surface that causes a fluid pressure at the second port to act in an opening direction of the valve element.

2. The fluid control valve according to claim 1,
wherein the valve element has a rod-like shape with a substantially circular cross-section; has, at two ends in the axial direction, a first end on a proximal side and a second end on a distal side, respectively; and includes a shaft portion positioned on a side of the first end and a valve portion continuous with a side of the second end of the shaft portion, the valve portion having the second pressure-receiving surface.

3. The fluid control valve according to claim 2,
wherein the shaft portion of the valve element includes a piston, and the first pressure-receiving surface positioned on the side of the first end of the piston defines a piston pressure chamber to which a pilot passage that allows the compressed fluid from the first port to be supplied to the piston pressure chamber is connected.

4. The fluid control valve according to claim 2,
wherein the valve portion includes a large-diameter part continuous with the shaft portion, and a small-diameter part continuous with the side of the second end of the large-diameter part and having a maximum diameter smaller than that of the large-diameter part, with a sealing member interposed between the large-diameter part and the small-diameter part,
wherein the valve hole has a throttle part provided between the second port and the exhaust-air passage and through which the small-diameter part of the valve portion extends, and
wherein the throttle part has a valve seat, the sealing member coming into contact with and moving away from the valve seat.

5. The fluid control valve according to claim 4,
wherein the fluid control valve includes a flow-rate-adjusting portion for adjusting a flow rate of exhaust air that flows from the second port into the exhaust-air passage at the opening of the valve portion,
wherein the flow-rate-adjusting portion includes an inclined cam surface extending helically around the shaft portion of the valve element, and a stopper tab also provided around the shaft portion of the valve element, the stopper tab coming into contact with the inclined cam surface while preventing the valve element from moving in the first-end side at the opening of the valve portion,
wherein the inclined cam surface and the stopper tab are rotatable relative to each other and about an axis of the valve element, and wherein the small-diameter part of the valve portion has a tapered shape whose diameter is gradually reduced toward the second end.

6. The fluid control valve according to claim 5, wherein the shaft portion of the valve element includes a piston, and the first pressure-receiving surface positioned on the side of the first end of the piston defines a piston pressure chamber to which a pilot passage that allows the compressed fluid from the first port to be supplied to the piston pressure chamber is connected,
wherein the inclined cam surface faces the piston from the first-end side of the piston, and
wherein the valve element extends through the valve hole in such a manner as to be rotatable in a peripheral direction, and the stopper tab projects from an outer periphery of the shaft portion toward an inner side of the piston pressure chamber.

7. A fluid control valve comprising:
a first port, a second port, and a third port through which compressed fluid flows;
a supply-air passage allowing the first port and the second port to communicate with each other;
an exhaust-air passage allowing the second port and the third port to communicate with each other;
a first check valve provided to the supply-air passage and allowing the compressed fluid to flow from a side of the first port toward a side of the second port while preventing the compressed fluid from flowing from the side of the second port toward the side of the first port;
a second check valve provided to the exhaust-air passage and allowing the compressed fluid to flow from the side of the second port toward a side of the third port while preventing the compressed fluid from flowing from the side of the third port toward the side of the second port;
a valve element that opens and closes a passage from the second port to the third port; and
an opening-and-closing-operation portion causing the valve element to open and close,
wherein the opening-and-closing-operation portion has a first pressure-receiving surface provided to the valve element and that causes a fluid pressure at the first port to act in a closing direction of the valve element, and a second pressure-receiving surface also provided to the valve element and that causes a fluid pressure at the second port to act in an opening direction of the valve element.

8. The fluid control valve according to claim 7, wherein the fluid control valve has a valve hole through which the valve element extends in such a manner as to be slidable in an axial direction of the valve element, and the exhaust-air passage is a gap provided between the valve hole and the valve element.

9. The fluid control valve according to claim 8, wherein the valve element has a rod-like shape with a substantially circular cross-section; has, at two ends in the axial direction, a first end on a proximal side and a second end on a distal side, respectively; and includes a shaft portion positioned on a side of the first end and a valve portion continuous with a side of the second end of the shaft portion, the valve portion having the second pressure-receiving surface.

10. The fluid control valve according to claim 9, wherein the shaft portion of the valve element includes a piston, and the first pressure-receiving surface positioned on the side of the first end of the piston defines a piston pressure chamber to which a pilot flow passage that allows the compressed fluid from the first port to be supplied to the piston pressure chamber is connected.

11. The fluid control valve according to claim 9, wherein the valve portion includes a large-diameter part continuous with the shaft portion, and a small-diameter part continuous with the side of the second end of the large-diameter part and having a maximum diameter smaller than that of the large-diameter part, with a sealing member interposed between the large-diameter part and the small-diameter part,
wherein the valve hole has a throttle part provided between the second port and the exhaust-air passage and through which the small-diameter part of the valve portion extends, and
wherein the throttle part has a valve seat, the sealing member coming into contact with and moving away from the valve seat.

12. The fluid control valve according to claim 11, wherein the fluid control valve includes a flow-rate-adjusting portion for adjusting a flow rate of exhaust air that flows from the second port into the exhaust-air passage at the opening of the valve portion,
wherein the flow-rate-adjusting portion includes an inclined cam surface extending helically around the shaft portion of the valve element, and a stopper tab also provided around the shaft portion of the valve element, the stopper tab coming into contact with the inclined cam surface while preventing the valve element from moving in the first-end side at the opening of the valve portion,
wherein the inclined cam surface and the stopper tab are rotatable relative to each other and about an axis of the valve element, and
wherein the small-diameter part of the valve portion has a tapered shape whose diameter is gradually reduced toward the second end.

13. The fluid control valve according to claim 12, wherein the shaft portion of the valve element includes a piston, and the first pressure-receiving surface positioned on the side of the first end of the piston defines a piston pressure chamber to which a pilot flow passage that allows the compressed fluid from the first port to be supplied to the piston pressure chamber is connected,
wherein the inclined cam surface faces the piston from the first-end side of the piston, and
wherein the valve element extends through the valve hole in such a manner as to be rotatable in a peripheral direction, and the stopper tab projects from an outer periphery of the shaft portion toward an inner side of the piston pressure chamber.

* * * * *